United States Patent
Mehnert

[11] 3,910,741
[45] Oct. 7, 1975

[54] APPARATUS FOR COLLECTING SURPLUS PLASTIC MATERIAL WHICH IS SEPARATED FROM BLOW MOLDED ARTICLES

[75] Inventor: Gottfried Mehnert, Berlin, Germany
[73] Assignee: Conduco AG, Zug, Switzerland
[22] Filed: Sept. 6, 1973
[21] Appl. No.: 394,723

Related U.S. Application Data
[63] Continuation of Ser. No. 145,972, April 28, 1971, abandoned.

[30] Foreign Application Priority Data
Apr. 30, 1970 Germany................................ 16308
Feb. 24, 1971 Germany................................ 08693

[52] U.S. Cl.................... 425/302 B; 425/Dig. 206; 425/Dig. 212; 425/326 B; 425/806; 425/455; 425/216
[51] Int. Cl.²...................... B29C 1/00; B29C 7/00
[58] Field of Search........ 425/302 B, 203, 212, 213, 425/326 B, 242 B, 215, 216, 217, DIG. 46, 806, DIG. 206, DIG. 212, 455

[56] References Cited
UNITED STATES PATENTS
2,994,103  8/1961  Schaich.............................. 425/806
2,995,775  8/1961  Schnitzius et al................... 425/217
3,325,862  6/1967  Mehnert.............................. 264/98

Primary Examiner—Francis S. Husar
Assistant Examiner—Robert J. Charvat
Attorney, Agent, or Firm—Michael S. Striker

[57] ABSTRACT

A blow molding apparatus for the production of plastic bottles has an open-and-shut mold which is movable between a blank-receiving station and a blowing station. The surplus material which adheres to the neck portions and bottom walls of bottles is separated and dropped to descend into or onto suitably configurated intercepting containers or plates for introduction into a path along which the surplus material is conveyed to a collecting receptacle without interfering with the transport of bottles. The conveyor for bottles can serve to transport the separated surplus material toward the receptacle and the intercepting devices can dump the surplus material at the blank-receiving or at the blowing station and in the closed or open position of the mold.

4 Claims, 12 Drawing Figures

APPARATUS FOR COLLECTING SURPLUS PLASTIC MATERIAL WHICH IS SEPARATED FROM BLOW MOLDED ARTICLES

CROSS-REFERENCE TO RELATED APPLICATION

This is a continuation of my copending application Ser. No. 145,972 filed Apr. 28, 1971 and now abandoned.

BACKGROUND OF THE INVENTION

The present invention relates to a method and apparatus for separating and collecting surplus plastic material which is separated from bottles or analogous hollow articles produced by the blow molding process. More particularly, the invention relates to a method and apparatus for separating the surplus which normally adheres to the upper and/or lower end portion of a blow molded hollow plastic article and for conveying such surplus in a manner to prevent interference with controlled transport of finished articles to a bottle filling, sterilizing, packing, capping or other station.

The operation of modern apparatus for the production of blow molded hollow plastic articles is normally controlled by an automatic programming system which assures that the articles which leave the cavity or cavities of one or more molds are properly oriented, supported and transported without any supervision on the part of attendants. Many apparatus for the production of blow molded plastic articles are further provided with automatic or semi-automatic means for separating the surplus which normally develops at the top or at the bottom of a hollow article and must be separated therefrom before the article reaches the next processing station. The surplus is normally in the form of webs, tubes, flanges, ribs, caps or like configurations and can be separated by pinching, pulling, bending and/or a combination of such procedures. It is important to insure that the surplus which has been separated from finished articles be removed from the blow molding apparatus in order to prevent clogging, interference with movements of components of such apparatus and/or interference with movements of finished articles along a predetermined path. The thermoplastic material of the articles and of the surplus is normally permitted or caused to set, at least to such an extent that the finished articles cannot undergo undue deformation, before the articles are removed from one or more cavities of the blow molding apparatus, and the surplus can be pinched off or otherwise separated from the finished articles in a completely or partially hardened condition.

Blow molding apparatus are preferred for the production of hollow articles in the form of bottles or the like, i.e., of articles having a closed end and an open end which normally constitutes or resembles a neck and serves to permit introduction or evacuation of flowable material and/or coupling of two or more articles to each other or to other parts. As a rule, when a blow molding apparatus is used for the production of bottles consisting of synthetic thermoplastic material, the surplus adheres to the neck portion and to the bottom wall of the finished article. Such surplus is present because the dimensions (the quantity of plasticized material) of tubular or strip-shaped blanks which are to be converted into hollow articles are at least slightly larger than necessary to form a hollow article. The surplus is squeezed into the spaces between the sections of the blow mold or adheres to the top and/or sides of the neck portion and must be separated from the finished article in order to enhance its appearance, to enable the article to assume a proper position on a supporting platform or conveyor, to allow for the attachment of a cap to an internally or externally threaded neck portion, and to reduce the space requirements of finished articles in storage or during transport.

Relatively large and highly complicated fully automatic molding apparatus are already provided with various types of means for separating the surplus from hollow articles and for conveying the separated surplus along one or more predetermined paths. The known separating and conveying means for the surplus are rather complicated, bulky, expensive and prone to malfunction. Furthermore, such conventional separating and conveying means for the surplus of synthetic thermoplastic material are not suited for use in many medium-sized or small blow molding apparatus wherein the surplus is likely to cause damage to moving parts and to interfere with movements of finished articles. The finished articles normally leave the space between the mold sections (in the open position of the mold) by gravity or are gripped by suitable tongs or analogous conveying elements for transport to a conveyor or to the next processing station. If the mold is opened while the material of the finished article is still in a deformable state, a piece of separated surplus material which is permitted to come into contact with the finished article is likely to adhere to such article and to deform the latter or to scar the external surface of the article. Pieces of surplus material which are permitted to contact a finished article while the latter is still in a deformable state must be separated by hand or the entire article must be discarded, either because it has undergone undesirable deformation or scratching so that it is not suited for the intended use.

It is further known that, in a semi-automatic or fully automatic blow molding apparatus, the mold cavity is likely to receive the blank or blanks in a position which is not suited for the formation of a satisfactory bottle or another hollow article. For example, if a tubular parison which is being extruded by the nozzle of an extruding machine is improperly separated from the next-following portion of extruded plasticized material, or if the blank which enters the mold cavity is held in an improper position of inclination or is too short, the blowing operation is likely to result in the formation of a defective article which must be discarded in order to prevent its transfer to the next processing station. In presently known blow molding apparatus such defective articles must be removed by hand which is a tedious procedure and necessitates constant attention by one or more workmen. A defective article is also likely to cause damage to or to arrest a blow molding apparatus if it is not removed from the path for satisfactory articles or if it is not prevented from entering such path before it can cause damage or a pileup of satisfactory and/or defective articles.

SUMMARY OF THE INVENTION

An object of the invention is to provide novel and improved means for separating the surplus from hollow blow molded synthetic plastic articles and for controlling the transport of the thus separated surplus so that it cannot interfere with the operation of a blow molding apparatus and/or with transport of finished articles.

Another object of the invention is to provide means which can be restored to for separation and transport of surplus synthetic thermoplastic material which is separated from the upper or lower end portion of a hollow blow molded article and irrespective of whether the surplus material remains attached to a part of the flow molding aparatus after separation from the respective article or is free to descend by gravity immediately upon separation.

A further object of the invention is to provide means of the above outlined character which can be resorted to for separation and transport of surplus material which adheres to the respective article during blow molding and/or of surplus material which forms a defective article, for example, an article whose shape and/or dimensions deviate from the shape and/or dimensions of a satisfactory hollow article.

An additional object of the invention is to provide relatively small, medium-sized, large, semi-automatic or fully automatic blow molding apparatus with novel and improved means for separating the surplus of synthetic plastic material from finished articles and for transporting the articles and the surplus material in such a way that the surplus material cannot interfere with the operation of the apparatus or with movements of finished articles or vice versa.

Still another object of the invention is to provide the blow molding apparatus with novel means for separating surplus material from the top portions or bottom portions of bottles or similar hollow articles and for guiding and transporting such surplus in a manner to prevent undesirable crossing of paths for the finished articles and the surplus.

A further object of the invention is to provide a blow molding apparatus, especially a blow molding apparatus wherein one or more open-and-shut molds are movable between a blowing station and a blank-receiving or filling station, with novel means for detecting, intercepting and transporting defective articles.

The combination of parts constituting the present invention is employed for manipulation of blow molded synthetic plastic articles and surplus material which develops in an -open-and-shut blow mold a an integral part of such articles. The combination comprises means for moving the mold between a first station which constitutes a blank-receiving or mold-filling station and a second or blowing station, means for introducing into the mold at the first station a deformable blank (preferably a tubular parison) which is to be converted into a hollow article with surplus material adhering thereto, means for moving the mold to the second station, means for expanding the blank in the mold with a pressurized blowing fluid to form a hollow article with surplus material, means for separating the surplus material from the article and for releasing the thus separated surplus material to descend by gravity, means for intercepting the descending surplus material and for conveying such material along at least one first predetermined path, and means for conveying the article (which is without surplus material or which still carries some surplus material) along a second predetermined path.

The second path can include a first portion wherein the article is oriented (for example, by passing through a hollow frustoconical orienting member) and a second portion which is preferably defined by an intermittently or continuously driven conveyor and wherein the thus oriented article advances in a predetermined direction.

The intercepting means may comprise means for introducing at least one suitably configurated and/or inclined intercepting surface into the second path in the closed position of the mold and for withdrawing such surface from the second path prior to evacuation of an article from the mold and prior to transport of the thus evacuated article along the second path. The withdrawal of the intercepting surface takes place with the intercepted surplus material thereon or subsequent to dumping of the intercepted surplus material into the first path.

If the article is a bottle which has an upper portion (such as an open neck portion) to which the surplus material adheres during blowing at the second station, the releasing of surplus material subsequent to its separation from the article preferably coincides with the dwell of the mold at the first station.

If the surplus material adheres to the bottom portion of a plastic bottle, the releasing of such surplus material subsequent to separation from the bottle preferably coincides with the dwell of the mold at the second station.

The first path may include at least one portion wherein the surplus material advances by gravity (e.g., in a duct or in a like guide means) and a collecting portion defined by a collecting receptacle or the like) where the surplus material comes to rest. Such first path may further include a conveying portion which is located between the one portion (duct) and the collecting portion (receptacle) and can be defined by one or more stretches of an endless belt, chain or a like conveyor.

The combination may further comprise means for intercepting defective articles prior to entry of such defective articles into the second path. This intercepting means may comprise means for moving at least one suitably configurated and/or inclined intercepting surface (e.g., the upper surface of a gate or the like) into a position between the mold and the second path in response to detection of a defective article in the mold. The detection can include monitoring the pressure of blowing fluid which is used to expand blanks in the cavity of the mold at the second station and producing a signal for movement of the intercepting surface to an operative position when the pressure of blowing fluid is without a predetermined range which is indicative of a satisfactory article.

The novel features which are considered as characteristic of the invention are set forth in particular in the appended claims. The improved blow molding apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Referring first to FIGS. 1 to 4, there is shown a portion of a blow molding apparatus for the production of hollow plastic articles 1 here shown as bottles of the type having a relatively large neck portion 14 and a cylindrical main body portion 13. The apparatus of FIGS. 1 to 4 is provided with means for intercepting and discarding surplus plastic material 11 which adheres to the blowing mandrel 16 when the latter is withdrawn from the blowing position at the blowing station.

Figure 1:
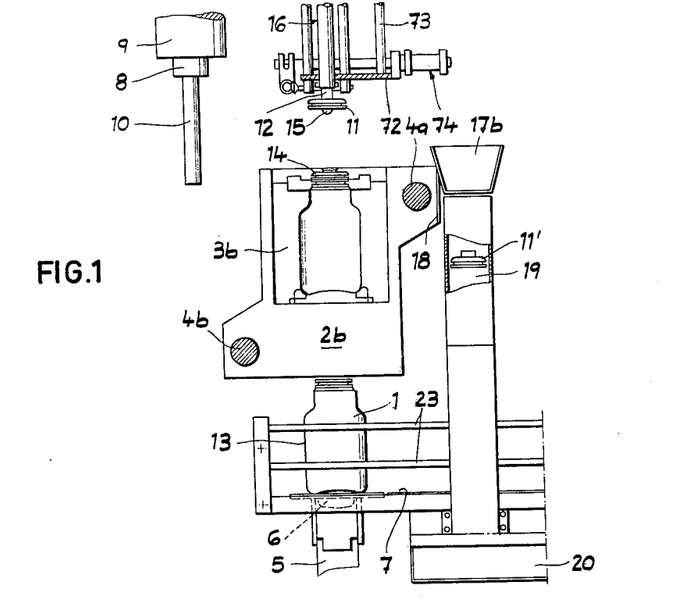
FIG. 1 is a fragmentary schematic side elevational view of a blow molding apparatus which embodies one form of the invention and is provided with novel means for separation of surplus material which adheres to the neck portions of plastic bottles and for transporting such surplus material along a predetermined path.
Figure 2:
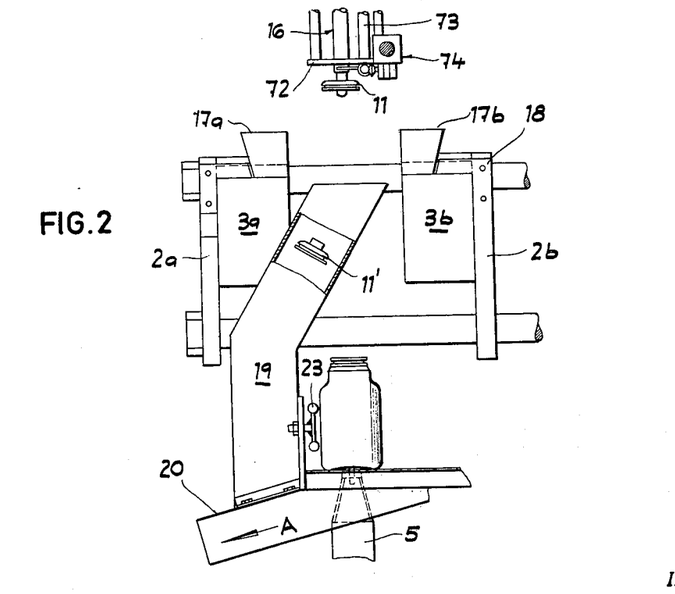
FIG. 2 is a front elevational view of the structure shown in FIG. 1 with the mold in open position at the blowing station.

The open-and-shut mold of the blow-molding apparatus comprises two mirror symmetrical mold sections 3a, 3b which are respectively mounted on platens 2a, 2b and are reciprocable with such platens along tie rods 4a, 4b to move between open and closed positions. The open positions of the mold sections 3a, 3b are shown in FIG. 2. The entire mold including the sections 3a, 3b, platens 2a, 2b and tie rods 4a, 4b is movable between a first or mold-filling position at a mold-filling or first station in which the cavity defined by the mold sections 3a, 3b can receive a fresh blank (e.g., a portion of a tubular parison 10 shown in the left-hand portion of FIG. 1) and a second position at a second or blowing station in which the cavity defined by the mold sections 3a, 3b registers with the blowing mandrel 16. The mold is caused to open at the first station or arrives at the first station in open position so that the parison 10 can be properly received in the space between the mold sections 3a, 3b, and the mold is also opened at the blowing station so that the freshly formed article 1 can be discharged to descend (a) by gravity and to be transported to a filling, sterilizing or other processing station (not shown) by a conveyor 7 or a conveyor 50 which will be described in connection with FIGS. 5 to 10, or (b) to be removed from the space between the mold sections 3a, 3b by a gripper or tongs 5 schematically shown in the lower parts of FIGS. 1 and 2. The gripper 5 is designed to engage a web-shaped projection 6 which extends downwardly from the bottom wall of the finished article 1 and constitutes a surplus which is to be separated from the article 1, preferably by the gripper 5. The means for moving the gripper 5 is designed to move the latter (while it clamps the surplus material 6 on a freshly formed article) vertically downwardly or along a downwardly inclined path whereby the gripper deposits the article 1 on the conveyor 7 and separates the surplus 6 from such article. A different mode of separating surplus material from the bottom walls of hollow articles will be described with reference to FIGS. 5 to 10.

The parison 10 is continuously extruded through the annular orifice of the nozzle 8 of a suitable extruding machine or extruder 9 which is located above the mold-filling or first station and is constructed and operated in a manner not forming part of the present invention. The operation of the extruder 9 is such that the nozzle 8 discharges a tubular parison 10 of requisite length not later than at the time when the mold returns to the first station and is ready to close in order to separate a satisfactory length of plasticized synthetic thermoplastic material from the tubular parison 10 which issues from the orifice of the nozzle 8.

The presently known blow molding apparatus for the production of bottles or like hollow articles which are provided with a neck portion having an opening for introduction or evacuation of flowable material or for coupling to another article or the like include means for shaping the neck portion in accordance with one of the following two methods: In accordance with the first method, the material which is to form the neck portion is displaced radially outwardly by a calibrating device, preferably a mandrel which also serves to admit into the interior of the blank in the mold cavity a stream of gaseous blowing fluid. As a rule, such shaping of the neck portion results in the formation of a tulip- or calyx-shaped surplus. In accordance with the second method, the neck portion is formed by pneumatically expanding the corresponding part of a deformable blank whereby the surplus at the neck portion constitutes a so-called lost head which is a cupped body and an example of which is shown in FIGS. 1–4, as at 11. Such cupped surplus is normally provided with a tubular extension 12 and adheres to the lower end portion 15 of the blowing mandrel 16.

The apparatus which is shown in FIGS. 1 to 4 is designed to produce bottles 1 with neck portions 14 of relatively large diameter. It is to be understood, however, that the invention can be embodied with equal advantage in blow molding apparatus which are employed for the production of bottles or like hollow articles with neck portions of relatively small diameter. As shown, the diameter of the neck portion 14 is not a small fraction of the diameter of the main body portion 13 but may approach, equal or exceed the radius of the main body portion. In the manufacture of such hollow articles, it is presently customary to resort to the second of the aforementioned two methods of forming the neck portion 14, namely, to expand the corresponding part of the parison 10 by introduction of compressed gaseous blowing fluid. The manner in which the resulting surplus 11 is thereupon separated from the neck portion 14 of the finished article will be explained hereinafter. The lower end portion 15 of the mandrel 16 which is surrounded by the tubular extension 12 of the surplus 11 immediately after separation from the neck portion 14 is hollow and serves to admit blowing fluid into the blank in the mold cavity. FIG. 1 illustrates the blowing mandrel 16 in the raised or retracted position in which the freshly separated surplus material 11 continues to adhere to the lower end portion 15 of the mandrel and is thereby lifted above the level of the neck portion 14 of the article 1 in the cavity of the mold. As a rule, the surplus material 11 further includes two webs (not shown) which are separated from the external surface of the neck portion 14 in response to lifting of the blowing mandrel 16 and are formed of material which is permitted to penetrate into the gaps between those parts of the mold sections 3a, 3b which serve to shape the external surface of the neck portion 14.

In accordance with a feature of the invention, the apparatus of FIGS. 1 to 4 further comprises an intercepting device 17 which serves to intercept the surplus material 11 when the latter is separated from the lower end portion 15 of the raised blowing mandrel 16 and to insure that the thus intercepted aurplus material cannot descend along the path for the finished article 1, i.e., along the path defined for the finished article by the gripper 5 and the conveyor 7. The intercepting device 17 of FIGS. 1 to 4 comprises two mirror symmetrical portions or halves 17a, 17b which are respectively secured to the platens 2a, 2b and are moved close to each other to form a funnel-shaped body in the closed position of the mold (see FIG. 4). It is clear that the portions 17a, 17b of the intercepting device 17 can be mounted on the mold sections 3a, 3b or on any other parts which share the movements of mold sections between open and closed positions. In the embodiment of FIGS. 1 to 4, the portions 17a, 17b of the intercepting device 17 are mounted on the platens 2a, 2b by means of brackets 18.

Figure 3:
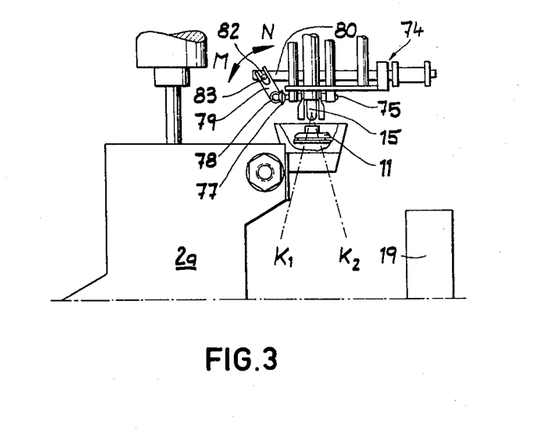
FIG. 3 illustrates a portion of the apparatus in a view similar to that of FIG. 1 but with the mold located at the blank-receiving or mold-filling station.

The intercepting device 17 is operative (see FIGS. 3 and 4) when the mold is closed while the mold sections 3a, 3b dwell at the first station so that the cavity of the closed mold registers with the orifice of the extrusion nozzle 8. This intercepting device is then located in the path of surplus material 11 which is being separated from the lower end portion 15 of the blowing mandrel 16. Such path is of conical shape, i.e., it diverges downwardly and its outline is represented in FIG. 3 by the phantom lines K1 and K2. The vertical axis of the closed intercepting device 17 preferably coincides with the axis of the blowing mandrel 16.

The intercepting device 17 is operative when the mold is closed while the sections 3a, 3b dwell at the first station and during transport of the mold toward the blowing station. When the closed mold reaches the blowing station, the device 17 is located above the inlet of a suitably inclined downwardly extending duct 19 which constitutes a guide means for directing surplus material 11 into a desired area as soon as the mold sections 3a, 3b begin to move apart at the blowing station in order to permit removal of the freshly formed article 1 by means of the gripper 5. The lower or discharge end of the duct 19 is located above a downwardly inclined chute 20 which can direct surplus material 11 into a collecting receptacle such as the receptacle 55 shown in FIG. 5. The arrangement can be such that the surplus 6 which is separated by the gripper 5 from the bottom wall of a finished article 1 can be directed onto the inclined chute 20 or directly into the aforementioned collecting receptacle. The inclination of the duct 19 is such that it does not interfere with downward movement of articles 1 which are held by and share the movement of the gripper 5. It is clear that the configuration of the duct 19 can deviate from the illustrated configuration, as long as it permits or enables the gripper 5 to lower the articles 1 onto the conveyor 7 so that the articles come to rest in an optimum position for transport and/or further treatment. In other words, the surplus material 6 and/or 11 should be caused to move along a discrete first path so as not to interfere with the transport of articles 1 which are moved along a second path defined by the gripper 5 and conveyor 7.

The configuration of the walls 21 of portions 17a, 17b of the intercepting device 17 is preferably such that, when the device 17 is operative, the walls surround a compartment wherein a freshly separated piece of surplus material 11 automatically descends into the lowermost zone and is invariably caused to enter the duct 19 by gravity as soon as the mold sections 3a, 3b start to move apart or not later than at the time when the mold is fully open. In the embodiment of FIGS. 1 to 4, the walls 21 are of concave shape and define a compartment which resembles a hollow hemisphere with its open top located in a substantially horizontal plane. This is clearly shown in FIG. 4 wherein a freshly separated piece of surplus material 11 is in the process of descending into contact with the intercepting device 17. Proper configuration of the surface which surrounds the compartment defined by the intercepting device 17 in closed positions of its portions 17a, 17b is particularly important when the pieces of surplus material 11 are rather small so that they would be likely to become stuck in corners, on ledges or like configurations. The reference character 22 denotes the central lowermost zone of the compartment defined by the intercepting device 17 wherein the surplus material 11 comes to rest and is compelled to leave the compartment when the portions 17a, 17b are moved apart. It is equally within the purview of the invention to provide the portions 17a, 17b with suitably inclined straight internal surfaces which form a compartment of inverted triangular cross-sectional outline when the device 17 is held in operative position.

The jaws of the gripper 5 can serve to cool the surplus 6 so that such surplus sets and can be more readily separated from the bottom wall of the respective hollow article 1 without leaving unsightly marks at the underside of the bottom wall. The surplus material 11 can be separated from the neck portion 14 simultaneously with or prior to engagement of surplus 6 by the jaws of the gripper 5. The separation of surplus material 11 can be carried out by pinching, twisting, cutting or another separating procedure. The nature of the separating procedure depends on the shape of surplus material which is to be separated from the neck portion, i.e., whether such surplus material is obtained by mechanical or pneumatic expansion of that part of a tubular blank in the mold cavity which is to form the neck portion of the finished article. The mold sections 3a, 3b are moved apart at the blowing station (below the mandrel 16) after the mandrel lifts the separated surplus material 11 which adheres to and surrounds its lower end portion 15 and after the jaws of the gripper 5 engage the surplus 6. The conveyor 7 can be flanked by one or more side walls or rails 23 (FIGS. 1 and 2) which insure that the articles 1 which travel with the conveyor 7 are compelled to advance along a predetermined path. The lifting of blowing mandrel 16 to the retracted position shown in FIG. 1 can take place simultaneously with, prior or subsequent to opening of the mold at the blowing station.

The mold, the platens 2a, 2b, and the tie rods 4a, 4b are then caused to move to the first station (below the extrusion nozzle 8) while the mold sections 3a, 3b are spaced from each other so that the mold sections flank the growing parison 10 which is suspended from the nozzle 8. The mold is thereupon closed whereby the mold sections (or separate severing means) sever a requisite length from the parison 10. Such closing of the mold causes a closing of the portions 17a, 17b of the intercepting device 17 which is then located at the blowing station. The arrangement is preferably such that, when the mold closes at the first station, the lower parts of the mold sections 3a, 3b automatically seal or close the lower end portion of the separated length (blank) of the parison 10 so that the blowing fluid which is thereupon admitted into the separated length of the parison at the blowing station cannot escape and causes an expansion of plasticized material of the blank to form a fresh hollow article 1 which carries a piece of surplus material 11 at its upper end and a piece of surplus material 6 at its lower end.

The path along which the mold sections 3a, 3b, the platens 2a, 2b, and the rods 4a, 4b move between the first and blowing stations may but need not be a straight path; for example, such parts can be caused to move along an L-shaped, arcuate, upwardly inclined, downwardly inclined or otherwise configurated path. It is important, however, that the intercepting device 17 (with its portions 17a, 17b in positions shown in FIG. 4) be located below the blowing mandrel 16 or within the space whose outline is indicated by the phantom lines K1 and K2 in order to insure that surplus material 11 which is separated from the end portion 15 of the blowing mandrel descends onto one or both internal surfaces of the walls 21 and enters the lowermost zone 22 of the compartment which is bounded by such surfaces. One of several suitable devices by means of which surplus material 11 can be separated from or stripped off the end portion 15 of the blowing mandrel 16 will be described hereinafter.

The mold (with its sections 3a, 3b closed to properly support the separated length or blank of parison 10 in the mold cavity) is thereupon caused to return into registry with the blowing mandrel 16 whereby the intercepting device 17 (with its portions 17a, 17b closed to support the surplus material 11) moves away from registry with the blowing mandrel. The latter thereupon descends and admits into the tubular blank in the mold cavity a stream of blowing fluid which expands the blank to convert it into a shaped article 1 with the lower surplus 6 and the upper surplus material 11. In the next step, the surplus material 11 is separated from the neck portion 14 of the freshly formed article 1 and the jaws of the gripper 5 grasp the surplus 6 prior to opening of the mold. Such opening results in opening of the intercepting device 17 whereby the portions 17a, 17b move apart at a level above the inlet of the duct 19 to drop or discharge the piece of surplus material 11 which descends by gravity to pass through the duct and onto the chute 20. A piece of surplus material 11 which has been separated from or stripped off the lower end portion 15 of the mandrel 16 and has been permitted to leave the compartment of the intercepting device 17 to pass through the duct 19 is indicated in each of FIGS. 1 and 2 by the reference character 11'. The direction in which the piece 11' advances along the upper side of the chute 20 is indicated by the arrow A which is shown in FIG. 2. As mentioned before, the chute 20 can also serve for transport of separated pieces 6 of surplus material. The pieces 6 are separated from the bottom wall of the respective articles 1 after such articles come to rest on the conveyor 7. It is clear, however, that the gripper 5 need not serve as a means for separating the surplus 6 which, if desired, can be broken off or otherwise separated by stationary devices located in the path of movement of surplus 6 with the conveyor 7 or in another suitable way.

Figure 4:
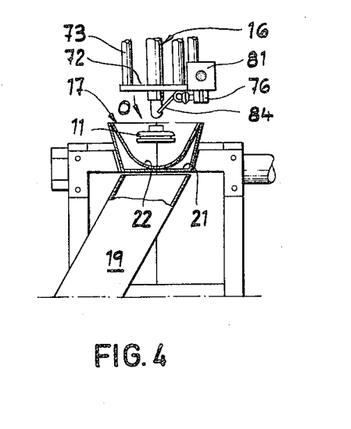
FIG. 4 is a front elevational view of the structure shown in FIG. 3 but with the mold in closed position at the blank-receiving station.

It is also within the purview of the invention to replace the two-piece intercepting device 17 with a one-piece intercepting device which can be pivoted or otherwise moved to an operative position (corresponding to that of the intercepting device 17 shown in FIG. 4) when the mold sections 3a, 3b close at the first station. For example, a one-piece intercepting device in the form of a cup or the like can be pivotally mounted on the mold section 3a or 3b or on the platen 2a or 2b and can be provided with a follower which engages a stationary cam when the mold reaches the first station to cause a pivotal movement of the one-piece intercepting device to the operative position in which the intercepting device is ready to receive a piece of surplus material 11 which is stripped off the end portion 15 of the blowing mandrel 16. A similar intercepting device will be described in connection with FIGS. 11 and 12. Also, the intercepting device may comprise three or more portions and the duct 19 can be replaced by an extension of the chute 20 or by other suitable means which is capable of guiding surplus material 11 along a desired path so that the surplus material does not interfere with movements of the article 1 during withdrawal from the space between the mold sections 3a, 3b at the blowing station.

Figure 5:
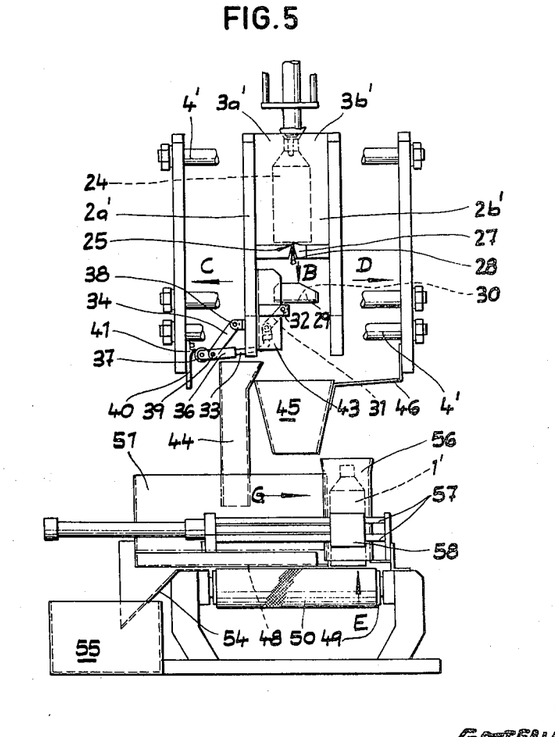
FIG. 5 is a fragmentary schematic front elevational view of a second blow molding apparatus which is provided with means for separating and transporting surplus material which adheres to the bottom wall of a plastic bottle, the mold being shown at the blowing station.

FIGS. 5 to 10 illustrate a modified blow molding apparatus wherein the parts denoted by reference characters 1', 2a', 2b', 3a', 3b', 4', 8', 9', 10', 11'' are identical with or clearly analogous to the similarly referenced parts of the apparatus shown in FIGS. 1 to 4. The apparatus of FIGS. 5 to 10 is provided with novel intercepting means for the surplus 28 which is to be separated from the bottom walls of the main body portions of hollow articles 1'. The lower portions of the mold sections 3a', 3b' are provided with pinching edges or knives 25 which are located at the lower end of the mold cavity 24 and serve to effect a closing of the lower end of the deformable tubular blank in the mold cavity 24 as well as to partially separate the lowermost part 26 from the blank. The just mentioned blank is obtained by serving from the parison 10' a suitable length of plasticized material while the mold dwells at the first station. Portions 27 of the pinching edges 25 are movable with reference to the mold cavity 24 to bodily detach the at least partially hardened surplus material 28 from the freshly formed article 1' in the mold cavity 24 shortly before the mold opens at the blowing station. The mechanism which moves the separating portions 27 of the pinching edges 25 with reference to the closed mold is known and its construction forms no part of the present invention. The direction of movement of separating portions 27 in the course of bodily separation of surplus material 28 from the respective article 1' is indicated by the arrow B (FIG. 5). The surplus material 28 falls onto an intercepting device 29 which has a supporting or intercepting surface 30. This surface is horizontal or substantially horizontal when the mold is closed at the blowing station and the separating portions 27 detach surplus material 28 from the article 1'. The surplus material 28 is obtained by hardening of the lowermost portion 26 of the plasticized blank in the cavity 24.

The mechanism which can pivot the intercepting device 29 between the operative position of FIG. 5 (in which the surface 30 is horizontal) and a dumping position (FIG. 6) includes a link 31 one end portion of which is rigid with the device 29 and is pivotably mounted on the platen 2a' (see the pivot pin 32). The other end portion of the link 31 is pivoted to one arm of a bell crank lever 33, as at 35. The other arm of the bell crank lever 33 is articulately connected to one end portion of a second link 34, as at 39. The link 34 is pivotably connected to the platen 2a' by a pin 38. The free end of the other arm of the bell crank lever 33 is bifurcated, as at 36, and carries a roller follower 37 in the form of an antifriction bearing which can track a stationary cam 40 secured to one of the frame members 42 for the tie rods 4'. The cam 40 has a lobe 41 which is engaged by the roller follower 37 when the mold sections 3a', 3b' are caused to move apart whereby the linkage including the parts 31, 33, 34 causes the intercepting device 29 to assume the inclined position of FIG. 6 and the surplus material 28 is caused to slide off the intercepting surface 30 to enter a duct 44. The directions in which the platens 2a', 2b' move toward the respective frame members 42 during opening of the mold are indicated by the arrows C and D (FIG. 5). The linkage 31, 33, 34 is arranged to pivot the intercepting device 29 in a vertical plane, i.e., about a horizontal axis defined by the pivot pin 32. The platen 2a' supports a short vertical duct 43 through which the surplus material 28 must pass on its way into the duct 44. The duct 43 registers with the inlet of the duct 44 when the linkage 31, 33, 34 causes the intercepting device 29 to dump a piece of surplus material 28, i.e., when the inclination of the intercepting surface 30 is such that the surplus material 28 slides of such surface and into the duct 43.

It is clear that the illustrated pivoting mechanism 31, 33, 34, 40 constitutes but one of several suitable means which can be used to effect a transfer of pieces of surplus material 28 from the intercepting device 29 into the dust 44. It is equally within the purview of the invention to resort to electrical, pneumatic or hydraulic means as a substitute for the illustrated mechanical pivoting means. For example, the intercepting device 29 can be pivoted by an electromagnet in circuit with a switch which is closed by a suitable trip in response to opening of the mold or by a hydraulic or pneumatic cylinder and piston unit receiving presssurized fluid by way of a valve which is opened by a solenoid in circuit with a switch which is closed in response to movement of the mold sections 3a', 3b' away from each other. It is further clear that the dumping of surplus material 28 by the intercepting device 29 need not take place immediately after the mold is caused to open at the blowing station. Thus, the intercepting device 29 can be pivoted when the mold, the platens and the frame members 42 dwell at the first station (see FIG. 8 and the phantom-line positions of frame members 42 in FIG. 9). In some instances, the aforementioned duct 44 can be dispensed with.

Figure 6:
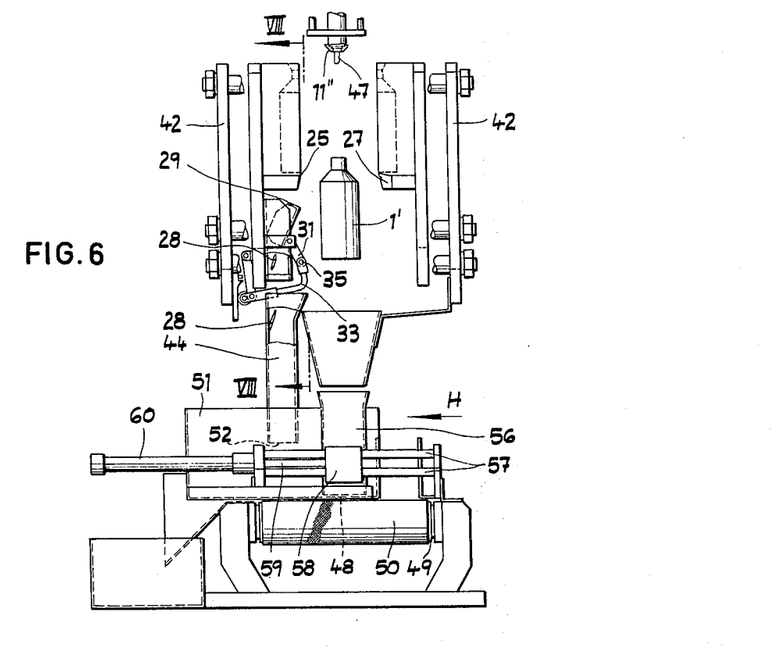
FIG. 6 is a similar front elevational view of the structure shown in FIG. 5, with the mold illustrated in open position at the blowing station.

The right-hand frame member 42 of FIGS. 5 and 6 supports a hollow frustoconical orienting and confining member 45 which serves to guide descending hollow articles 1' during travel from the cavity 24 of the mold onto the aforementioned conveyor 50. The orienting member 45 is secured to the respective frame meber 42 by a bracket 46. The articles 1' descend by gravity and pass through the orienting member 45 as soon as they become separated from the blowing mandrel 47 in the open position of the mold (see FIG. 6). Prior to reaching the conveyor 50, the articles 1' which have passed through the orienting member 45 come to rest on a platform 48 consisting of sheet metal or the like.

The conveyor 50 is an endless band or chain which is mounted at a level below the platform 48 and is trained around rollers 49 to move its upper stretch in the direction indicated by an arrow E. This conveyor serves to transport the finished articles 1' as well as the surplus material 28. Furthermore, the conveyor 50 serves to transport unsatisfactory or defective articles such as those shown at 64 in FIG. 9. A sheet metal wall 51 extends transversely across the upper stretch of the conveyor 50 in front of the platform 48 (see particularly FIGS. 9 and 10) and serves to support the aforementioned duct 44. The platform 48 terminates at the supporting wall 51 and the discharge end 52 of the duct 44 can deliver pieces of surplus material 28 directly onto the upper stretch of the conveyor 50. The latter advances such material against an arcuate deflector 53 which causes the surplus material to move off the upper stretch of the conveyor 50 and to pass through a chute 54 on its way into the collecting receptacle 55. The wall 51 and deflector 53 extend across the major part of the upper stretch of the conveyor 50 (see FIG. 10); the width of the remaining part of the upper stretch at least equals the diameters of articles 1'. As mentioned before, the receptacle 55 can collect surplus material 28 as well as that surplus (see the part denoted by the reference character 11'' in FIG. 6) which is separated from the neck portion of an article 1'.

An article 1' which has descended through the orienting member 45 comes to rest on the platform 48 in a space bounded at three sides by the panels of a horizontally reciprocable transfer member or pusher 56. The pusher 56 has a sleeve 58 which is slidable along horizontal guide rods 57 by a motor here shown as a double-acting hydraulic or pneumatic cylinder and piston unit 60. The piston rod 59 of the unit 60 is connected with the sleeve 58 and serves to move the pusher 56 between the receiving position of FIG. 6 and the discharging position of FIG. 5. The directions in which the pusher 56 is reciprocable are indicated by arrows G and H.

Figure 9:
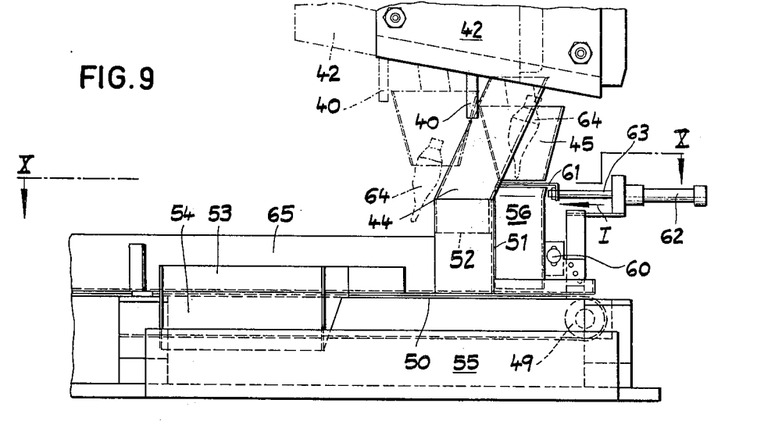
FIG. 9 is a fragmentary side elevational view of the second apparatus as seen from the right-hand side of FIG. 5 or 6.
Figure 10:
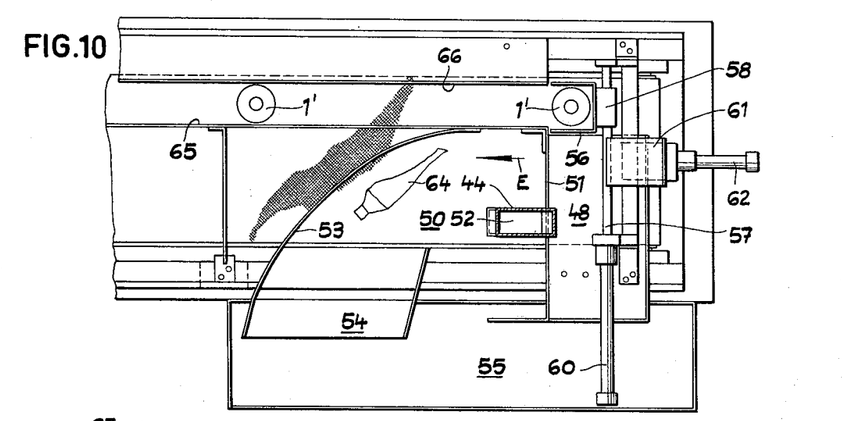
FIG. 10 is a horizontal sectional view as seen in the direction or arrows from the line X—X of FIG. 9.

When a freshly formed article 1' descends through the orienting member 45 and comes to rest on the platform 48, the pusher 56 is located in the position shown in FIG. 9. The cylinder and piston unit 60 then causes the piston rod 59 to perform a working stroke and to shift the pusher 56 to the position shown in FIG. 5 so that the article 1' is moved off the platform 48 and onto the conveyor 50 to be entrained in the direction indicated by the arrow E. The direction in which the pusher 56 moves the article 1' off the platform 48 is indicated by the arrow G. The conveyor 50 transports the article 1' to a station where the article receives a measured quantity of flowable material, to a labelling or imprinting station, to a packing station or to another destination.

Those articles (64) which are of unsatisfactory size or shape or are otherwise defective also constitute a surplus or scrap and should be automatically evacuated from the blow molding apparatus. The means for evacuating such defective articles 64 includes an auxiliary intercepting device or gate 61 which is reciprocable by a hydraulic or pneumatic motor 62 having a piston rod 63 which is movable in and counter to the direction indicated by the arrow I shown in FIG. 9. The motor 62 can move the gate 61 into and from the gap between the lower end of the orienting member 45 and the pusher 56. The control means for actuating the motor 62 comprises a detector (not shown) which is preferably a pressure gauge and generates a signal whenever the pressure of blowing fluid which is admitted into a blank in the mold cavity 24 is below a predetermined minimum pressure. Such relatively low pressure (or the absence of pressure) is indicative that the blank in the mold cavity has a leak through which the blowing fluid can escape and hence indicates that the blank is being converted into a defective article 64. The provision of such detector constitutes a safety measure in order to insure that all such articles which are likely to be (or are) of unsatisfactory size and/or shape are automatically segrated from the satisfactory articles 1'.

In the illustrated embodiment, the motor 62 is a double-acting hydraulic or pneumatic cylinder and piston unit. However, it is equally possible to employ a single-acting cylinder and piston unit which contains a spring serving to normally maintain the gate 61 in the position shown in FIG. 9. The control system then comprises a detector in the form of a relief valve which is caused to actuate the motor when the pressure of blowing fluid which flows into a blank in the mold cavity 24 is satisfactory so that the motor withdraws the gate 61 to the retracted position and permits a satisfactory article 1' to descend into the space defined by the panels of the pusher 56.

When the gate 61 is caused to assume the extended position of FIG. 9, i.e., when the apparatus is in the process of producing an unsatisfactory article 64, the article 64 descends into the orienting member 45 as soon as the mold opens but such article cannot descend onto the platform 48. The mold is thereupon moved to the first station (in which the frame members 42 assume the positions shown in FIG. 9 by phantom lines) so that the orienting member 45 is moved away from registry with the pusher 56 and is located at the left-hand side of the wall 51, as viewed in FIG. 10, so that the defective article 64 drops onto the upper stretch of the conveyor 50 and is entrained toward the deflector 53 to be introduced into the chute 54 and thence into the collecting receptacle 55.

Figure 8:
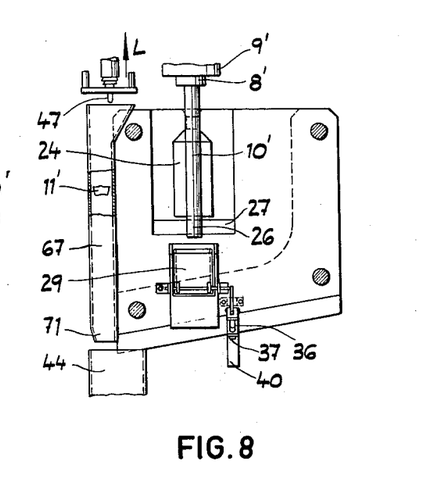
FIG. 8 illustrates the structure of FIG. 7 but with the mold located at the blank-receiving station.

The intercepting device 29 can be pivoted to the dumping position shown in FIG. 6 (by the mechanical means 31, 33, 34 or by the aforementioned electrical, hydraulic or pneumatic means) when the mold dwells at the first station as shown in FIG. 8. the pivoting of the intercepting device 29 then takes place while the mold is still in open position. The surplus material 28 which is caused to leave the intercepting surface 30 of the tilted device 29 then also descends onto the upper stretch of the conveyor 50 by way of a suitable guide means similar to the duct 44. In other words, the surplus material 28 can descend onto the conveyor 50 while the mold dwells at the blowing station or at the first station.

It is further within the purview of the invention to replace the relatively wide conveyor 50 with a much narrower conveyor which serves the sole purpose of transporting satisfactory articles 1' to a further processing station. Such conveyor can be so narrow that its width merely approximates or equals the diameter of a satisfactory article 1'. A satisfactory minimum width of the conveyor for articles 1' equals that of the space between the guide rails 65, 66 shown in FIG. 10. The receptacle 55 is then placed below the discharge opening or outlet 52 of the duct 44 (in the position of the duct 44 shown in FIG. 10) so that the surplus material 28 can descend into such receptacle as soon as it leaves the outlet 52, i.e., without being transported by the conveyor 50. The relatively narrow conveyor (which can be used in place of the conveyor 50) is then positioned in a vertical plane which includes the pusher 56 in the position shown in FIG. 6. The pusher 56 is then unnecessary and can be omitted, together with the deflector 53 and platform 48, i.e., a satisfactory article 1' which has advanced through the orienting member 45 comes to rest directly on the upper stretch of the narrow conveyor.

If the blow molding apparatus of FIGS. 5 to 10 is simplified in the just-outlined manner (by replacing the conveyor 50 with a narrower conveyor whose upper stretch travels below the orienting member 45), the defective articles 64 cannot be intercepted in a manner as described above (gate 61 and motor 62). However, it is possible to provide the apparatus with scanning means which are adjacent to the path of articles 1', 64 on the upper stretch of the narrow conveyor to detect defective articles 64 and to automatically segregate them from satisfactory articles 1', for example, by resorting to one or more pneumatic ejectors or the like. Also, the duct 44 can be mounted for movement in and counter to the direction indicated by the arrow H shown in FIG. 6 to receive defective articles 64 as soon as the mold opens whereby the defective articles 64 pass through the duct 44 and enter a suitable receptacle, not shown. In other words, the duct 44 can be secured to one of the frame members 42 or it may be mounted for movement relative to such frame members in response to signals which are indicative of the formation of defective articles 64. It is also possible to increase the distance between the level of the lower end of the orienting member 45 and the level of the upper end of the pusher 56 and to replace the gate 61 with a downwardly inclined gate which automatically compels a defective article 64 to move laterally of the narrow conveyor for satisfactory articles 1' and to enter a collecting receptacle or the like. Such inclined gate can be reciprocated or otherwise moved to and from an operative position in the same way as the gate 61.

The chute 20 of the apparatus shown in FIGS. 1 to 4 can be mounted to deliver surplus material 11 onto the conveyor 50, into the chute 54 or directly into the collecting receptacle 55. Thus, the apparatus of FIGS.

5–10 can embody those parts of the apparatus of FIGS. 1–4 which are used to intercept and guide the surplus material 11.

Figure 7:
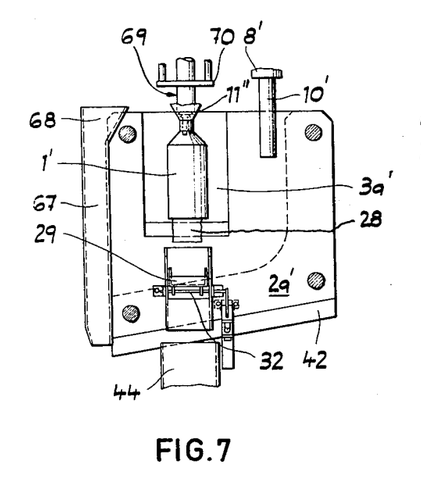
FIG. 7 illustrates a portion of the second blow molding apparatus in a view as seen in the direction of arrows from the line VIII—VIII of FIG. 6, with the mold located at the blowing station.

Another mode of regulating the movements of surplus material 11″ which is separated from the neck portions of finished articles 1′ is shown in FIGS. 7 and 8. One of the frame members 42 (which support the tie rods 4′ and share the movements of mold sections 3a′, 3b′ and platens 2a′, 2b′ between the first and blowing stations) supports a guide member or duct 67 having at its upper end a funnel-shaped inlet 68 which is located below the blowing mandrel 47 when the mold dwells at the first station (see FIG. 8). The mandrel 47 forms part of a blowing and calibrating mechanism 69 and supports the surplus material 11″ which must be forcibly separated therefrom to enter the inlet 68 and to descend in the duct 67 by gravity. The means for separating the surplus material 11″ from the mandrel 47 comprises a stripping plate 70. The surplus material 11″ is automatically separated from the mandrel 47 when the blowing and calibrating mechanism 69 is caused to move upwardly as indicated by the arrow L shown in FIG. 8. The lower end portion 71 of the duct 67 is located above the inlet of the duct 44 when the mold dwells at the first station (FIG. 8) so that the surplus material 11″ descends onto the conveyor 50 and is deflected by the member 53 to enter the receptacle 55 by way of the chute 54. It will be seen that the guide member or duct 67 constitutes a simple intercepting device which can perform the functions of the device 17 shown in FIGS. 1–4 and simultaneously defines a portion of the path for surplus material 11″.

The exact moment of separation of surplus material 11 or 11″ from the blowing mandrel 16 or 47 is of considerable importance. Also, the separation of surplus material 11 or 11″ from the respective mandrel should be completed within a very short interval of time in order to insure that the descending surplus material can enter the compartment of the intercepting device 17 or the duct 67. One of the systems for insuring rapid separation of surplus material 11 from the respective blowing mandrel 16 is illustrated in FIGS. 1 to 4. The mandrel 16 forms part of a blowing and calibrating mechanism which further includes a horizontal plate-like support 72 located at a level above the lower end portion 15 in the raised or retracted position of the mandrel 16. The support 72 is suspended on rods 73 which are secured to the ceiling or to an overhead component of the stationary part of the frame for the blow molding apparatus. The support 72 carries a drive 74 for a stripping device which separates surplus material 11 from the lower end portion 15 of the mandrel 16. The stripping device comprises a pivotable stripping lever 84 which is turnable with a shaft 75 rotatably mounted in bearing brackets 76 secured to the support 72. One end portion of the shaft 75 extends beyond the respective bearing bracket 76 and is connected with a bevel gear 77 meshing with a second bevel gear 78 which is mounted on a link 79. The link 79 is pivotable by the piston rod 80 of a hydraulic or pneumatic motor 81 of the drive 74. To this end, the piston rod 80 carries a pin 83 extending into a slot 82 at the upper end of the link 79. The directions of oscillatory movement of the link 79 are indicated by the arrows M and N shown in FIG. 3. The shaft for the bevel gear 78 is rotatably mounted on the support 72, i.e., the link 79 is pivotable about the axis of the bevel gear 78.

When the mold sections 3a, 3b are being moved toward each other, the stripping lever 84 can be pivoted from the inoperative position of FIGS. 1 and 2 to the operative position of FIGS. 3–4 to separate the surplus material 11 from the lower end portion 15 of the mandrel 16 at a time when the portions 17a, 17b of the intercepting device 17 are sufficiently close to each other to insure that the separated surplus material 11 enters into and remains in the central lowermost zone 22 of the compartment defined by the walls 21. The arrangement is preferably such that the motor 81 causes its piston rod 80 to pivot the link 79 to the position of FIGS. 3–4 after the mold is closed to make sure that the portions 17a, 17b of the intercepting device 17 abut against each other when the surplus material 11 becomes separated from the lower end portion 15 of the mandrel 16 in response to pivotal movement of the stripping lever 84. Such pivotal movement is caused by the mating bevel gears 78, 77 which rotate the shaft 75 for the stripping lever 84. The pivotal movement of the stripping lever 84 to its operative position is indicated by the arrow O shown in FIG. 4. The free end of the stripping lever 84 is preferably bifurcated so that its prongs straddle the lower end portion 15 and push the surplus material 11 downwardly toward the intercepting device 17.

The just described mechanism for pivoting the stripping lever 84 constitutes but one of several mechanisms which can be used to move the lever 84 (or an equivalent stripping member) in a manner to separate the surplus material 11 from the lower end portion 15 to the mandrel 16. For example, the bevel gear 77 can be replaced by a spur gear and the bevel gear 78 is then replaced with a toothed rack which is reciprocable by the motor 81 or another suitable prime mover to rotate the shaft 75 and hence the lever 84 between the operative and inoperative positions. The motor 81 is preferably designed to complete the pivotal movement of the stripping lever 84 in a direction (arrow O) to separate the surplus material 11 from the mandrel 16 within a short interval of time and to thereupon return the lever 84 to its inoperative position.

Figure 11:
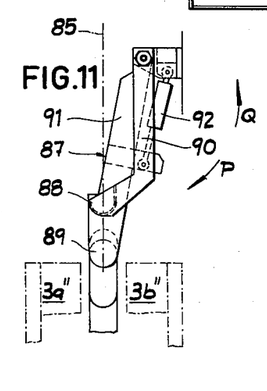
FIG. 11 is a diagrammatic fragmentary front elevational view of a third blow molding apparatus which is provided with a different intercepting device for surplus material which is separated from the neck portions of plastic bottles.
Figure 12:
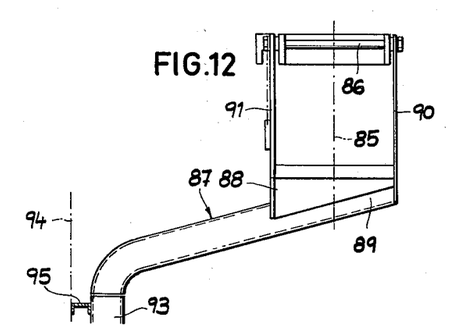
FIG. 12 is a side elevational view of the structure shown in FIG. 11.

Another mechanism for separating surplus material (11″) from the blowing mandrel (47) is illustrated in FIGs. 11 and 12. This mechanism can be used with advantage in the apparatus of FIGS. 5 to 10 or as a substitute for the mechanism shown in the upper portions of FIGS. 1–4. In FIG. 11, the axis of the blowing mandrel is indicated by a vertical phantom line 85.

The so-called blowing head (which constitutes a component of the blowing and calibrating mechanism including the mandrel) supports a shaft 86 for a pivotable intercepting device 87 which resembles a ladle and can move back and forth in directions indicated by the arrows P and Q shown in FIG. 11. The intercepting device 87 comprises a cupped container 88 and a tube 89 which communicates with the container 88 and serves to convey pieces of surplus material 11″, i.e., such surplus material which has been separated from the neck portions of hollow articles. The parts 88, 89 of the intercepting device 87 are provided with arms 90, 91 which are pivotable on the shaft 86. The means for pivoting the parts 88, 89 comprises a hydraulic or pneumatic motor 92 here shown as including a cylinder and piston unit and serving to move the cupped container 88 into the path of surplus material which is separated from the mandrel. The latter is movable up and down, as viewed in FIG. 11 or 12. The motor 92 pivots the intercepting device 87 out of the path of the mandrel before the latter is caused to descent and to penetrate into a fresh blank in thet mold cavity.

When the blowing of a fresh article is completed, the sections 3a'', 3b'' of the mold are moved apart and the freshly formed article is caused or permitted to descend. The mandrel is raised simultaneously with, prior to or subsequent to opening of the mold and the motor 92 thereupon moves the intercepting device 87 to the position shown in FIGS. 11 and 12 in which the cupped container 88 is in registry with the mandrel, and more particularly in the path of surplus material which has been separated from the neck portion of the freshly formed article and has adhered to the mandrel at least during the first stage of upward movement of the mandrel to its raised position. The mechanism which serves to separate surplus material from the blowing mandrel can be constructed in a manner as shown in FIGS. 1 to 4.

As mentioned before, the cupped container 88 communicates with the tube 89 which is inclined in a downward direction so as to guide surplus material into a duct 93 which can convey such surplus material into a collecting receptacle such as the receptable 55 of the apparatus shown in FIGS. 5 to 10.

As a rule, a blow molding apparatus comprises a large number of movable parts and, therefore, the front side of the apparatus is normally provided with a protective screen which reduces the likelihood of injury to a careless attendant but permits convenient observation of the operation of blow molding apparatus. In many instances, the protective screen is furnished in the form of a door with one or two panels which are pivotable about vertical axes. FIG. 12 shows a protective screen 94 in the form of a door. The duct 93 for reception of pieces of surplus material (11 or 11'') is preferably secured to the movable part of the screen (see FIG. 12), for example, by means of a profiled bar 95, so that it is readily accessible when the door-shaped part of the screen 94 is moved to its open position. Also, such mounting of the duct 93 insures that an attendant can readily gain access to the sections 3a'', 3b'' of the mold and to other components when the door-shaped portion of the protecting screen 94 is open. As a rule, the just-mentioned movable portion of the screen 94 will be moved to its open position when the apparatus is idle.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

I claim:

1. In a blow molding apparatus, a combination comprising an open-and-shut mold having sections movable between open and closed positions and frame means for said sections, said frame means being movable with said sections between a first and a second station; means for supplying said mold with deformable synthetic thermoplastic blanks at said first station; means for expanding a blank in said mold at said second station with attendant conversion of the blank into a hollow article and surplus material which adheres to the article; means for effecting removal of articles from said mold before said frame means and said sections return from said second to said first station; means for transporting the thus removed articles along a first predetermined path; means for separating at least some surplus material from the articles; and means for intercepting the thus separated material and for introducing the intercepted material into a second predetermined path so that the separated material is prevented from contacting articles in said first path, saaid intercepting means comprising duct means mounted on said frame means and arranged to register with said separating means while said frame means and said sections dwell at said first station.

2. A combination as defined as claim 1, wherein said duct means is provided with a funnel-shaped inlet for surplus material.

3. A combination as defined in claim 1, wherein said duct means has an outlet for said surplus material, and further comprising second duct means having an inlet in register with said outlet to receive surplus material from said first mentioned duct means while said frame means and said mold sections are located at said first station.

4. A combination as defined in claim 3, further comprising means for separating additional surplus material from blanks at one of said stations, and means for introducing the thus separated additional surplus material into said inlet of said second duct means while said outlet of said first mentioned duct means is out of register with said inlet.

* * * * *